United States Patent [19]

Mochizuki et al.

[11] Patent Number: 5,274,484
[45] Date of Patent: Dec. 28, 1993

[54] GRADATION METHODS FOR DRIVING PHASE TRANSITION LIQUID CRYSTAL USING A HOLDING SIGNAL

[75] Inventors: Akihiro Mochizuki, Atsugi; Katsusada Motoyoshi, Yokohama, both of Japan

[73] Assignee: Fujitsu Limited, Kawasaki, Japan

[21] Appl. No.: 867,539

[22] Filed: Apr. 13, 1992

[30] Foreign Application Priority Data

Apr. 12, 1991 [JP] Japan .................. 3-079463

[51] Int. Cl.$^5$ .................. G02F 1/1343; G02F 1/137; G09G 3/36
[52] U.S. Cl. .................. 359/55; 359/54; 359/84; 359/90; 345/87; 345/89
[58] Field of Search .................. 359/55, 84, 87, 91, 359/99, 101, 105, 102, 90, 56, 77; 340/784, 793

[56] References Cited

U.S. PATENT DOCUMENTS

| | | | |
|---|---|---|---|
| 3,718,382 | 2/1973 | Wysochi et al. | 359/89 |
| 4,264,148 | 4/1981 | Göbl-Wunsch et al. | 359/99 |
| 4,317,115 | 2/1982 | Kawakami et al. | 359/55 X |
| 4,380,372 | 4/1983 | Taguchi | 359/78 |
| 4,542,960 | 9/1985 | Yang | 359/55 |
| 4,617,646 | 10/1986 | Yang | 359/55 X |
| 4,664,483 | 5/1987 | Van Sprang et al. | 359/55 |
| 4,812,034 | 3/1989 | Mochizuki et al. | 383/122 |
| 4,832,461 | 5/1989 | Yamagishi et al. | 359/91 X |
| 5,101,288 | 3/1992 | Ohta et al. | 359/54 |
| 5,189,535 | 2/1993 | Mochizuki et al. | 359/55 |

FOREIGN PATENT DOCUMENTS

| | | |
|---|---|---|
| 58-5791 | 1/1983 | Japan . |
| 61-60782 | 3/1986 | Japan . |
| 61-198270 | 9/1986 | Japan . |

OTHER PUBLICATIONS

"Electric field induced color changes and pitch dilation in cholesteric liquid crystals", Frederic Kahn, Feb. 1970, Physics Review Letters.

Primary Examiner—William L. Sikes
Assistant Examiner—Kenneth Parker
Attorney, Agent, or Firm—Staas & Halsey

[57] ABSTRACT

A method for driving a phase transition type liquid crystal display device having a liquid crystal display panel, fabricated by filling and sealing a phase transition type liquid crystal in a space formed between two substrates including two groups of electrodes thereon respectively and having a driving means applying the voltage between different electrodes, comprises a process of altering the length of the helical pitch by a time by applying the voltage a little higher or lower than the sustaining voltage to the selected picture elements for a short time or a process of altering the length thereof partially in one element by applying a similar voltage in the given portion of each element, so that gradational display with the middle brightness is attained.

16 Claims, 13 Drawing Sheets

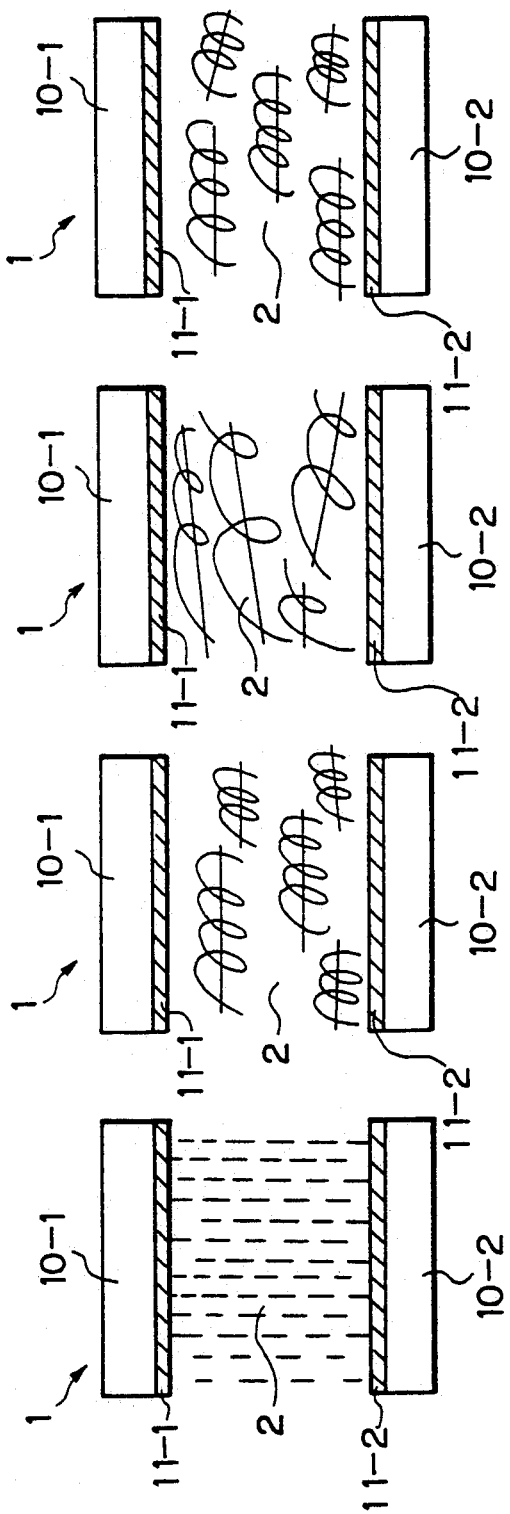

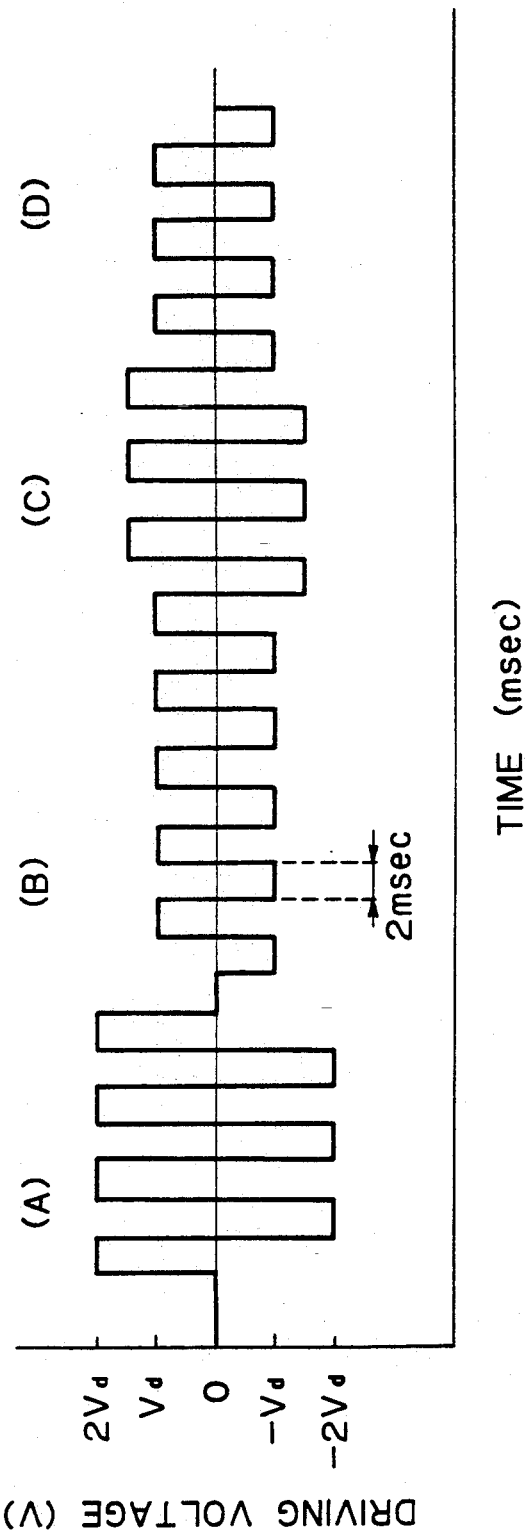

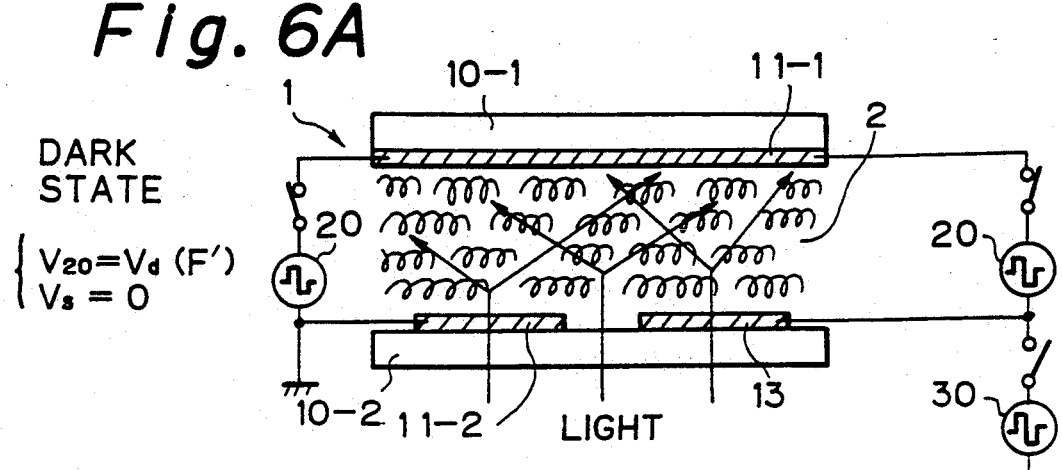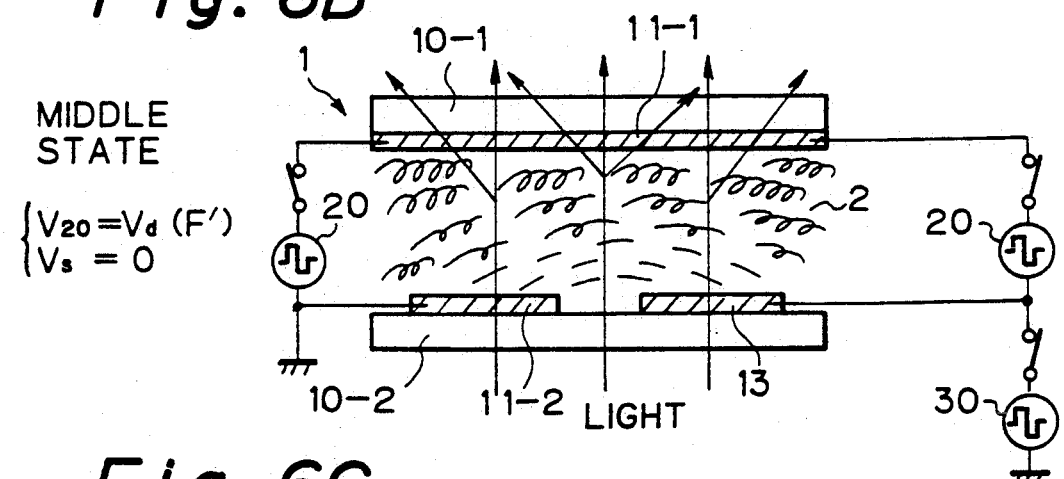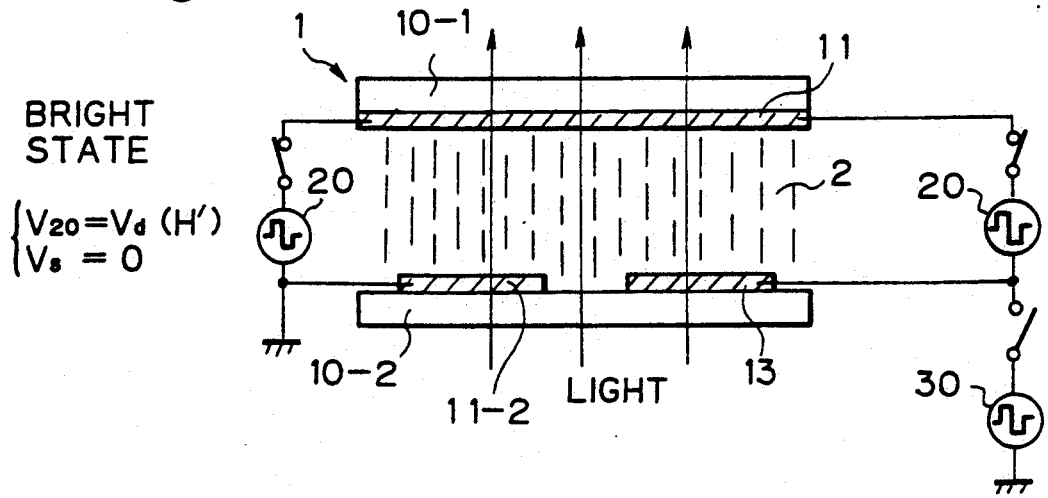

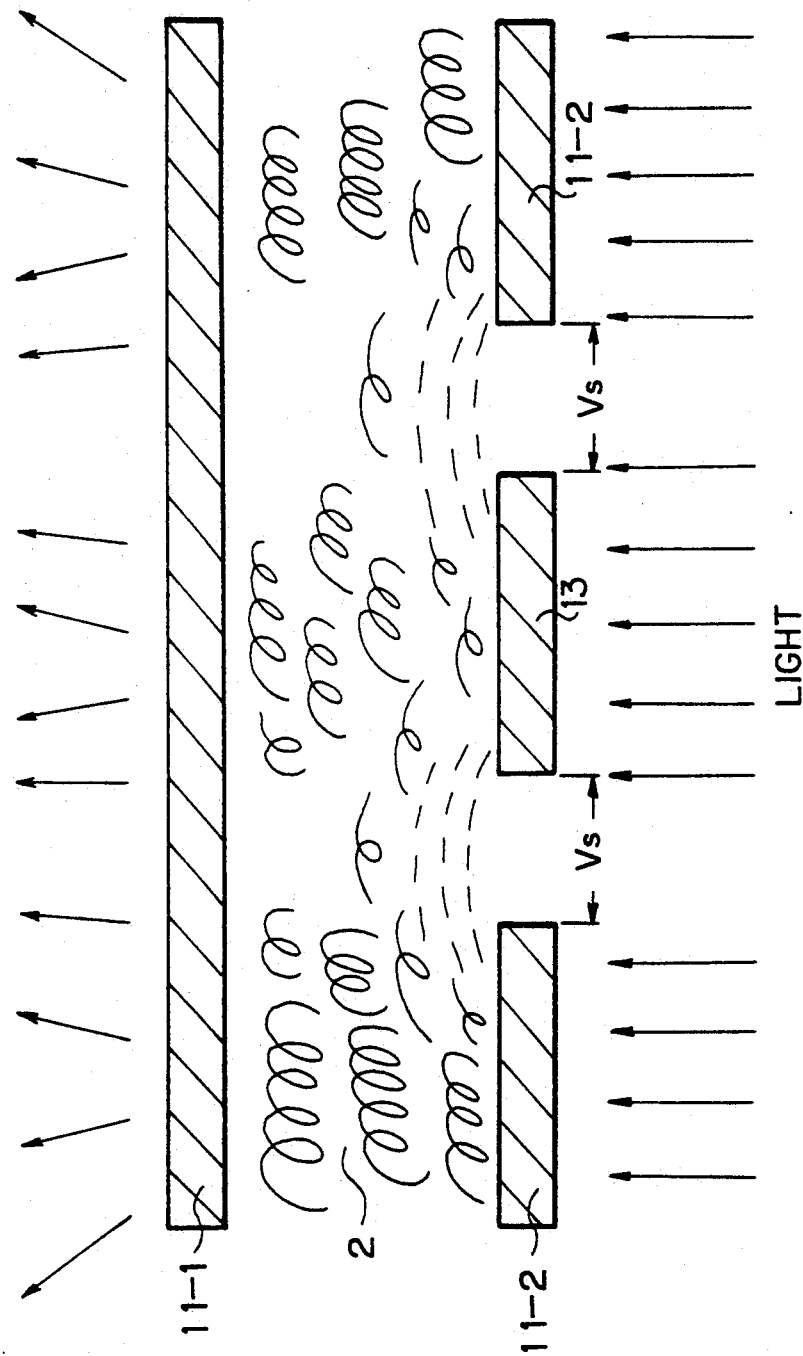

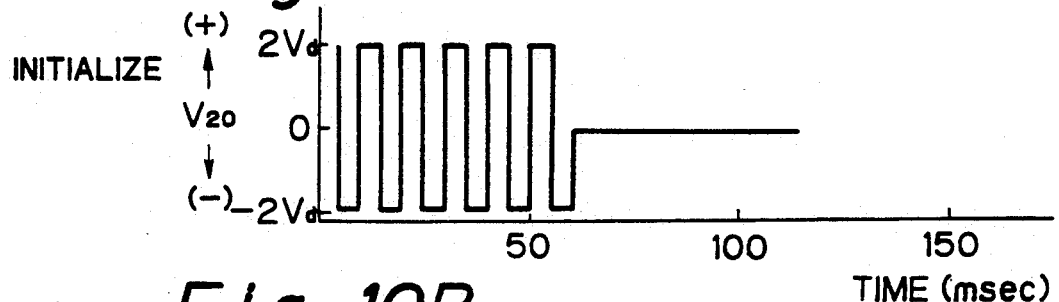
Fig. 10A INITIALIZE
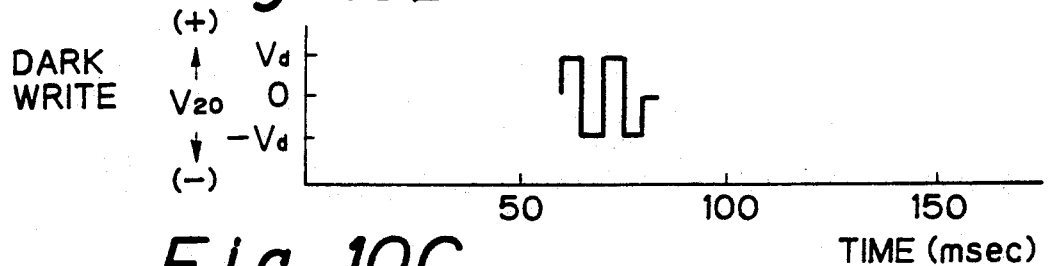
Fig. 10B DARK WRITE
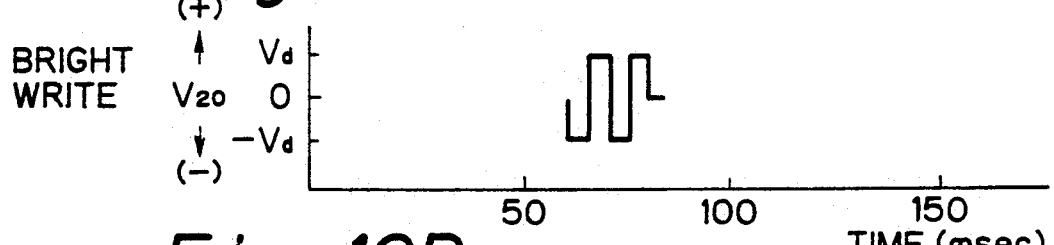
Fig. 10C BRIGHT WRITE
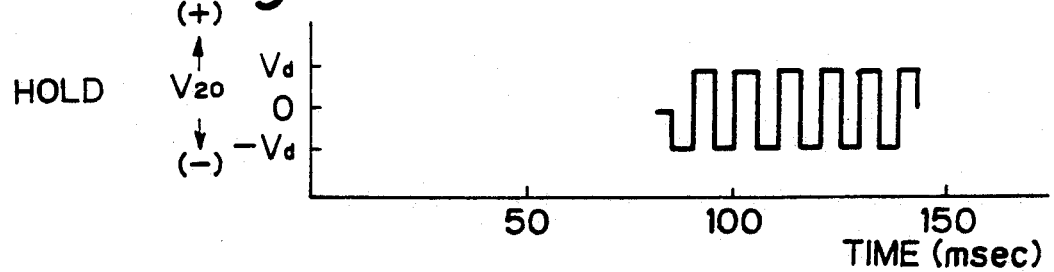
Fig. 10D HOLD
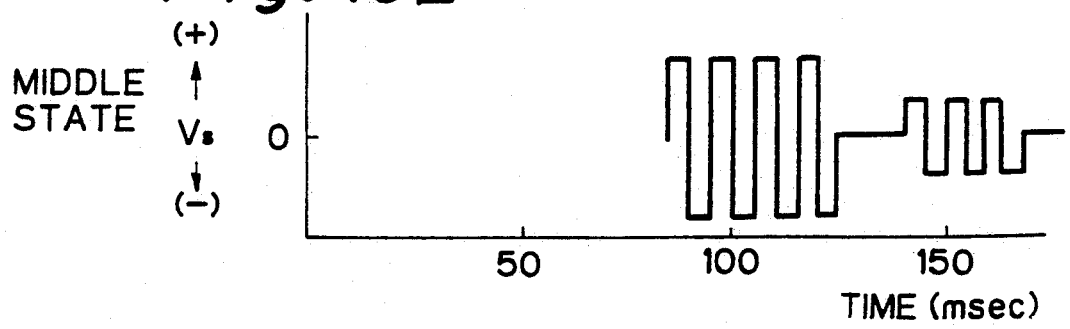
Fig. 10E MIDDLE STATE

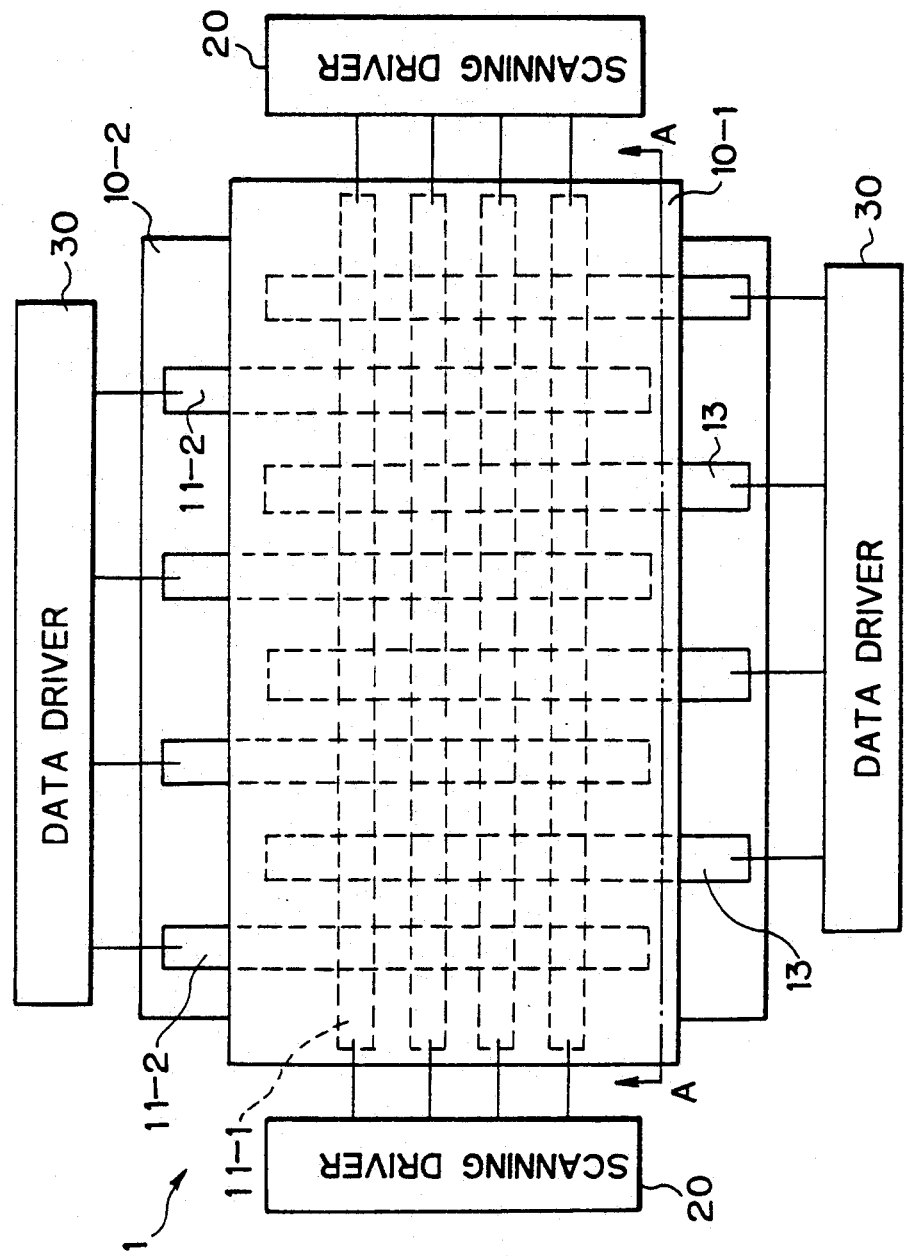

GRADATION METHODS FOR DRIVING PHASE TRANSITION LIQUID CRYSTAL USING A HOLDING SIGNAL

BACKGROUND OF THE INVENTION

1. Field of the Invention

The present invention relates to a method for driving a phase transition type liquid crystal display device. More specifically, it relates to such a method that realizes gradational display, as well as binary display, e.g., bright and dark display, in the liquid crystal display device comprising a nematic-cholesteric (cholesteric-nematic) phase transition type liquid crystal display panel, which allows a bright and stable screen display over a large image area and is capable of writing and erasing image information because of the memory effect and further promotes compactibility.

2. Description of the Related Art

Generally, liquid crystal display devices, utilizing conventional kinds of liquid crystals, such as twisted nematic (TN) liquid crystals and super twisted nematic (STN) liquid crystals, have such advantages that they have a thin and passive-type construction and are light weight and require relatively low power consumption. Due to the above advantages, the conditions that are necessary for panel type or portable type display devices, can be practically satisfied in the above liquid crystal display devices. Accordingly, they have attracted public attention in various regions. Particularly, in recent years, the performance of the above mentioned liquid crystal display device has improved significantly and the cost thereof has decreased significantly with the development of electronics and computer systems and therefore they have been widely used for office automation (OA) systems, domestic electric apparatuses and wrist watches, etc.

On the other hand, projection type liquid crystal devices such as over head projectors (OHP), including the liquid crystal display panels capable of a screen display over a large image area, are now in demand and come into practical use in some areas other than those of the former TN and STN liquid crystal display devices.

Among the latter liquid crystal display devices, the liquid crystal display device utilizing nematic-cholesteric (N-C) phase transition type liquid crystal have a memory function in which the information can be stored by selectively driving the liquid crystal with the driving voltage. If the bistable drive between bright conditions and dark conditions is executed for the above N-C phase transition type liquid crystal, by virtue of its memory function, a brighter and flicker-free image having large amounts of picture elements and an high resolution can be attained on a large screen. Therefore, the above liquid crystal display device can be expected to be applied to terminals for presentation at educational conferences, public notices and the like, as a projection type display device. In other words, it is suitable to be used when many persons discuss a particular topic while simultaneously viewing a screen {see, for example, Japanese Unexamined Patent Publication No. 61-60782 (the corresponding U.S. application is copending) and No. 61-198270 (corresponding to U.S. Pat. No. 4812034)}.

Generally, the above mentioned N-C phase transition type liquid crystal has a hysteresis curve in the light transmittance characteristic in relation to the driving voltage applied to the liquid crystal, different from the characteristic of TN liquid crystal and STN liquid crystal. Typically, when the voltage is relatively low, the liquid crystal is in a cholesteric phase, i.e., focal-conic (F) state in which the incident light is scattered in the liquid crystal and is difficult to be transmitted. Next, even when the voltage is increased, the above liquid crystal still remains in a focal-conic (F') state similar to the F state as long as the voltage is below the threshold voltage ($V_{CN}$) from the cholesteric phase to the nematic phase. Further, when the voltage is above $V_{CN}$, the light transmittance of the liquid crystal increases rapidly and soon the liquid crystal reaches the nematic phase, i.e., transparent homeotropic (H) state in which the light transmittance thereof is sufficiently high so that the incident light may be substantially transmitted. Conversely, even when the voltage is decreased gradually from the initial voltage for the H state of the liquid crystal, it remains in an homeotropic (H') state similar to the H state as long as the voltage is above the threshold voltage $V_{NC}$ from the nematic phase to the cholesteric phase, which is usually lower than the former threshold voltage $V_{CN}$. When the voltage is below the $V_{NC}$, the liquid crystal reaches the F state again. As explained above, when the driving voltage applied to the N-C phase transition type liquid crystal is increased and decreased, the light transmittance thereof changes, passing through the respective corresponding routes different from each other, namely, making a hysteresis curve. In this case, the above liquid crystal attains two stable states, i.e., H (H') state and F (F') state, corresponding to the bright state and the dark state respectively, for an applied voltage between the $V_{NC}$ and $V_{CN}$, for example the sustaining voltage $V_d$ described later. Therefore, the stable binary display between the dark state and the bright state with a storage mode can be attained in an N-C phase transition type liquid crystal.

Here, the process for fabricating a liquid crystal display device using the above liquid crystal will be described in detail. First, a couple of transparent substrates, e.g., glass substrates are provided. Next, plural lines of transparent striped electrodes made of transparent conductive films, e.g., indium tin oxide (ITO) films, are formed on the above substrates respectively. One of the above two groups of striped electrodes are called scanning electrodes, while the other electrodes are called signal electrodes. Further, the alignment coatings that make the liquid crystal align to the fixed direction are formed on the two groups of electrodes respectively, and then a spacer of about 10 μm thickness is held between the two substrates. If the N-C phase transition type liquid crystal is filled and sealed in an enclosed space formed by the above spacer, an N-C phase transition type liquid crystal display panel having the above mentioned hysteresis characteristic is finished. The picture elements are formed in the above liquid crystal display panel, corresponding to all the intersections between scanning electrodes and signal electrodes. If the appropriate voltage is applied by the drivers between two groups of electrodes selectively (in the form of an image), a desired image is formed on the display panel by means of the above picture elements. If the display panel is combined with an optical system composed of a light source, condensing lens and screen, etc., the above desired image is enlarged and projected on the screen. By the above mentioned process, a projection type liquid crystal display device comprising an N-C phase transition type liquid crystal display device is fabricated.

This N-C phase transition type liquid crystal display device does not need a polarization plate, different from the TN liquid crystal display device and the STN liquid crystal display device, etc. Accordingly, the former display device has the following advantages:

First, the image on the screen becomes brighter and an excellent image contrast can be attained.

Second, a temperature rise of the liquid crystal due to absorption of light of the polarization plate can be avoided, and therefore the characteristics of the liquid crystal do not deteriorate.

Furthermore, the N-C phase transition type liquid crystal display device is operative to control the scattering of light, not the phase lead or phase log. Therefore, the light, which does not reach the condensing lens of the OHP because of the scattering, is not finally projected on the screen. Consequently, the image contrast on the screen can be much better than that of the TN and STN liquid crystal.

However, as explained above, the N-C phase transition type liquid display device executes only a bistable drive of H (bright) state and F (dark) state utilizing hysteresis characteristics. In other words, the light transmittance of the above liquid crystal display device does not correspond on a one to one basis in relation to the driving voltage, different from that of the TN and STN liquid crystal display device. Therefore, the middle state between the H state and F state, i.e., middle brightness is difficult to display with good reproducibility. A gradational display by controlling the above middle brightness with function higher than a binary display of bright and dark states is likely to be required by various users. Thus, the development of the N-C phase transition type liquid display device that allows a gradational display is desired.

SUMMARY OF THE INVENTION

Accordingly, the object of the present invention is to provide a method for driving a phase transition type liquid crystal display device that allows not only a binary display by means of a bistable driving of bright and dark states, but also a gradational display for displaying middle brightness between the bright and dark states.

To attain the above object, the following method is provided for driving the phase transition type liquid crystal device having a phase transition type liquid crystal display panel, which is fabricated by filling and sealing the liquid crystal capable of phase transition between the nematic phase having an infinite length of helical pitch and the cholesteric phase having a fixed length thereof, in an enclosed space formed by confronting a first substrate and a second substrate with each other; the first substrate including plural lines of first electrodes and the second substrate including plural lines of second electrodes orthogonal to said first electrodes, and driving means applying an appropriate voltage between the above first electrodes and second electrodes selectively to force the liquid crystal to be in nematic phase or cholesteric phase; namely, the method comprising a process of controlling the length of said helical pitch appropriately by altering the applied voltage, so that the brightness corresponding to the middle condition between said bright condition and dark condition can be displayed and a gradational display can be attained.

In a first preferred embodiment, the method includes the following two steps:

the step of applying the additional voltage that is below or above a sustaining voltage where the nematic phase or cholesteric phase is sustained stably and is short of dominance of the phase transition, for the predetermined time to picture elements in the liquid crystal display panel selectively; and thereafter, the step of setting the above applied voltage at the sustaining voltage. Further, the above two steps are preferably repeated. In such operations, the middle brightness which allows a gradational display can be displayed by altering the length of the helical pitch in each of the selected picture elements for a short time such that the phase does not transfer because of the time accumulative effect.

In a second preferred embodiment, the method includes the following two simultaneous steps:

the step of applying the sustaining voltage to all of the picture elements in the liquid crystal display panel; and the step of applying the additional voltage that is below or above the sustaining voltage and is short of dominance of the phase transition to the given portions of the selected picture elements. In such operations, the middle brightness can be displayed by altering the length of the helical pitch partially in each area of the selected picture element, i.e., by changing the average length for the whole area therein. In this case, the length of helical pitch in each selected picture element is controlled mainly by the sustaining voltage. Therefore, even when the additional voltage is applied for a relatively long time, the phase does not transfer, different from the first preferred embodiment.

In the first and second embodiments, either of the first or second electrodes are preferably scanning electrodes that supply the liquid crystal display panel with a voltage for initializing all of the picture elements. Further, at least one of the first and second electrodes are preferably signal electrodes that supply the selected picture elements of the liquid crystal panel a the voltage for executing a gradational display.

To be more concrete about the second embodiment, plural lines of auxiliary electrodes are arranged between the adjoining signal electrodes respectively, and the voltage for executing a gradational display is applied to the above auxiliary electrodes selectively.

Both of the first and second embodiments may be preferably applied to the projection type liquid crystal display devices having an optical system, such as OHP.

Further, the electrode configuration, in which signal electrodes and auxiliary electrodes are arranged alternately, is disclosed previously (see, for example, Japanese Unexamined Patent Publication No. 58-5791. However, in this prior art, the sustaining voltage and the additional voltage are not applied simultaneously to the above two kinds of electrodes and therefore the gradational display cannot be attained, different from the present invention.

BRIEF DESCRIPTION OF THE DRAWINGS

The above object and features of the present invention will be more apparent from the following description of the preferred embodiments with reference to the accompanying drawings, wherein:

FIGS. 3A, 3B, 3C and 3D are sectional side views explaining operations of a phase transition type liquid crystal display panel according to a first preferred embodiment;

FIG. 4 is a time chart showing the waveform of a driving voltage for executing a gradational display according to a first preferred embodiment;

FIGS. 6A, 6B and 6C are sectional side views explaining operations of a phase transition type liquid crystal display panel according to a second preferred embodiment;

FIG. 7 is an enlarged sectional side view showing in detail the condition of alignment of a phase transition type liquid crystal in FIG. 6B;

FIGS. 10A, 10B, 10C, 10D and 10E are time charts showing the waveforms of driving voltage for executing a gradational display according to a second preferred embodiment;

FIG. 11 is an example of an electrode configuration for executing a gradational display according to a second preferred embodiment;

DESCRIPTION OF THE PREFERRED EMBODIMENTS

Before describing the embodiments of the present invention, the related art and the disadvantage therein will be described with reference to the related figures.

Figure 1:
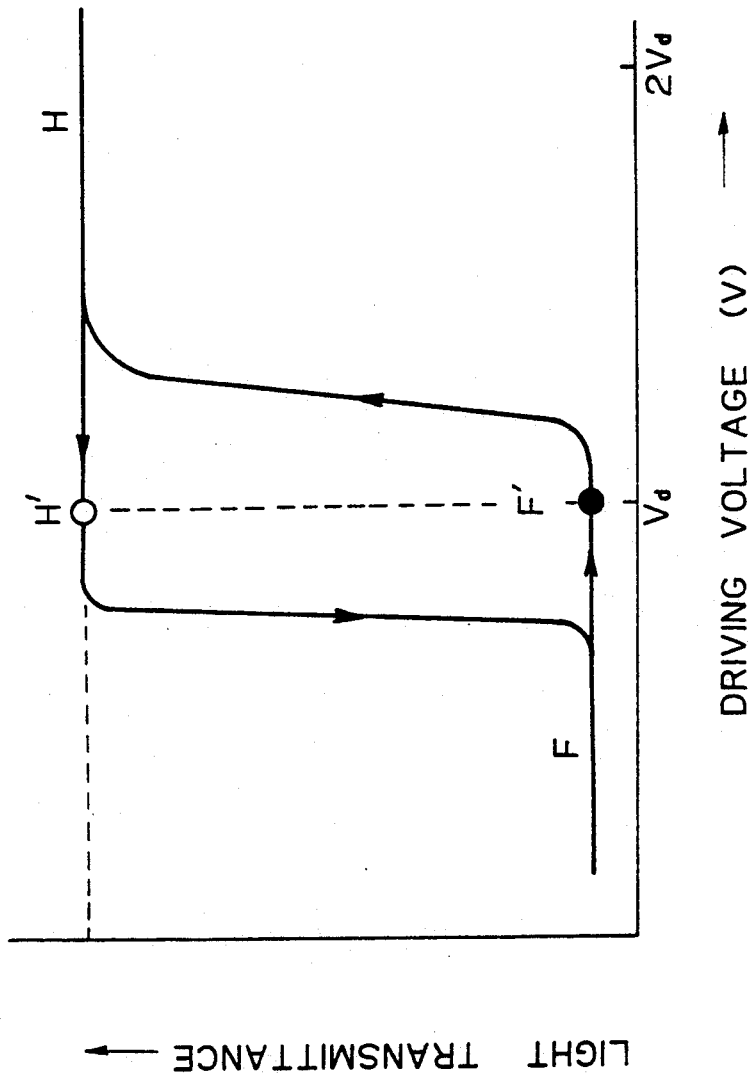
FIG. 1 is a hysteresis curve showing the light transmittance characteristic in relation to a driving voltage according to a prior art.

FIG. 1 is a hysteresis curve showing light transmittance characteristics in relation to a driving voltage according to a prior art.

In FIG. 1, the light transmittance is taken in the ordinate axis (Y-axis), while the driving voltage is taken in the quadrature axis (X-axis). In this case, the phase transition liquid crystal display panel has a hysteresis curve in the relation between the light transmittance and the driving voltage, different from the TN and STN liquid crystal display panel. Typically, when the voltage is relatively low (nearly equal to zero), the liquid crystal is in a cholesteric phase, i.e., focal-conic (F) state in which the incident light is scattered in the liquid crystal and difficult to be transmitted. Next, even when the voltage is increased up to approximately the sustaining voltage $V_d$, the above liquid crystal remains stably in a focal-conic (F') state similar to F state. However, when the voltage is further increased up to about $2V_d$, the light transmittance of the liquid crystal increases rapidly and the liquid crystal attains the nematic phase, i.e., transparent homeotropic (H) state in which the light transmittance thereof is sufficiently high so that the incident light may be substantially transmitted. Conversely, even when the voltage is decreased gradually from approximately $2V_d$ for an H state of the liquid crystal through the sustaining voltage $V_d$, it remains stably in an a homeotropic (H') state similar to the H state. When the voltage is further decreased sufficiently below the sustaining voltage $V_d$, the light transmittance of liquid crystal decreases rapidly and the liquid crystal attains a F state again. In such operations, when the driving voltage applied to the N-C phase transition type liquid crystal is increased and decreased, the light transmittance thereof changes, passing through the respective corresponding routes different from each other, namely making a hysteresis curve. In this case, the above liquid crystal becomes either of two stable states, i.e., H (H') state or F (F') state, corresponding to the bright state and dark states respectively, for one driving voltage, e.g., a sustaining voltage $V_d$, whether the current state attains the H' state or F, state at $V_d$, is determined by the previous state, as shown in the hysteresis curve of FIG. 1. Thus, the stable binary display between the dark state and bright state with a storage mode can be attained in the N-C phase transition type liquid crystal.

Figure 2A:
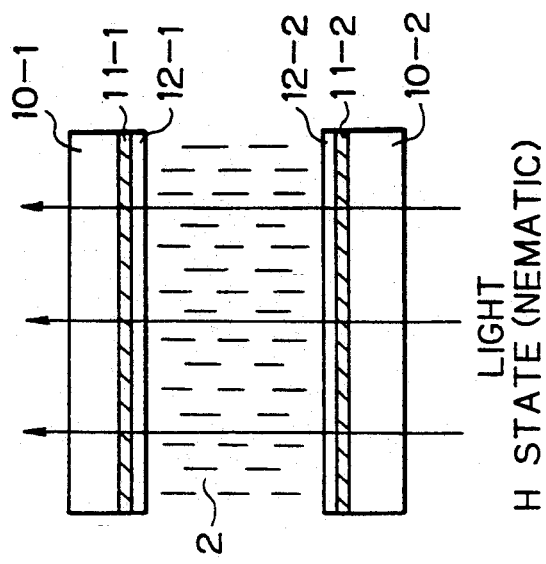
FIG. 2A and 2B are sectional side views explaining operations of a phase transition liquid crystal display panel according to a prior art.
Figure 2B:
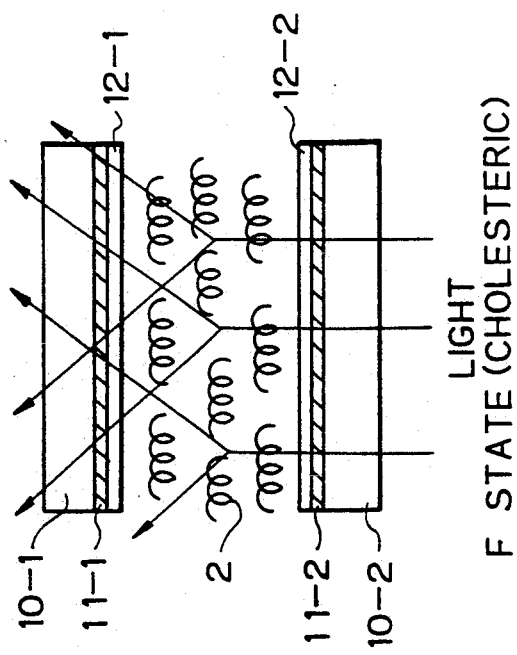

FIGS. 2A and 2B are sectional side views explaining operations of a phase transition liquid crystal display panel according to a prior art.

To be more specific in FIGS. 2A and 2B, the condition of alignment of molecules in the F state (nematic phase) and H state (cholesteric phase) are illustrated schematically in FIG. 2A and FIG. 2B respectively. In FIG. 2, 10-1, 10-2 denote a first transparent substrate and a second substrate transparent respectively, such as glass substrates. 11-1, 11-2 denote plural lines of first transparent striped electrodes and plural lines of second transparent striped electrodes made of transparent conductive films, e.g., ITO films. Generally, the first and second electrodes are utilized as scanning electrodes and signal electrodes, respectively. These scanning electrodes and signal electrodes are assembled such that they are orthogonal to each other and picture elements are in a liquid crystal display panel formed in all of the intersections between the above two groups of electrodes. 13-1, 13-2 denote a first alignment coating and a second alignment coating respectively, which enable molecules of a liquid crystal to align in the fixed direction. 2 denotes an N-C phase transition type liquid crystal that is filled and sealed in an enclosed space between the first and second substrates 10-1, 10-2.

As shown in FIG. 2A, in the F state (cholesteric state) where the driving voltage is relatively low, the molecules of a liquid crystal are gathered to form a number of domains. These domains are twisted gradually and have an helical construction in which the liquid crystal has a fixed length of an helical pitch macroscopically. When the length of the helical is approximately equal to that of visible light (for example, 0.8 μm), the incident light is scattered sufficiently at the boundary between the adjoining domains. Consequently, the light is not transmitted through the liquid crystal 2 and the above liquid crystal 2 attains the dark state. On the other hand, as the driving voltage is increased, the helical pitch of the liquid crystal is elongated gradually and finally diverges; the length of which is infinite as shown in FIG. 2B. In such a condition, the phase of the liquid crystal 2 transfers from the F state to H state (nematic phase) in which molecules of the liquid crystal align themselves vertical to the surface of substrates 11-1, 11-2. Therefore, the incident light is transmitted through the liquid crystal 2 without scattering and the above liquid crystal 2 attains the bright state. Thus, a bistable display of the dark state and bright state utilizing an N-C phase transition liquid crystal display device can be executed, as already shown in FIG. 1.

However, when the above N-C phase transition type liquid crystal display device is driven by the driving voltage, the light transmittance of the liquid crystal does not correspond on a one to one basis in relation to the driving voltage and therefore only the bistable state of the bright and dark states can be sustained with stability. In other words, it is difficult for the middle brightness corresponding to the middle state between the bright and dark state to be displayed according to a prior art, as shown in FIGS. 1 and 2.

Figure 5:
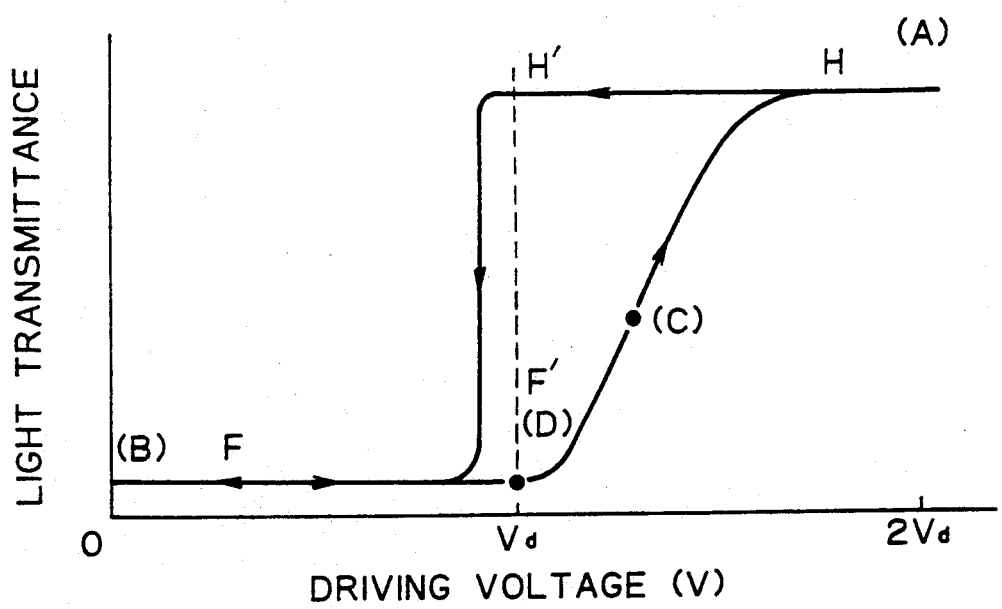
FIG. 5 is a hysteresis curve explaining operations of FIG. 4.

FIGS. 3A, 3B, 3C and 3D, FIG. 4 and FIG. 5 are views explaining the method of driving a phase transition type liquid crystal display device according to a first preferred embodiment of the present invention. To be more specific, FIGS. 3A, 3B, 3C and 3D are sectional side views explaining operations of a phase transition type liquid crystal display panel and FIG. 4 is a time chart showing the waveform of driving voltage for executing a gradational display and FIG. 5 is a hysteresis curve for explaining operations of FIG. 4. From now on, any component that is the same as that mentioned before will be referred to using the same reference number. Further, in this case, a liquid crystal 2, plural lines of first and second electrodes 11-1, 11-2 and a first and second transparent substrates 10-1, 10-2 of a phase transition type liquid display panel 1 are illustrated representatively and only one enlarged picture element in the liquid crystal display panel 1 is illustrated for simplifying the explanation of a liquid crystal display panel 1 of a phase transition liquid crystal display device.

In FIGS. 3A to 3D, plural lines of upper first electrodes 11-1 are preferably used as scanning electrodes that supply the phase transition type liquid crystal display panel with the initializing voltage for changing all of the picture elements of a liquid crystal into initial states, e.g., H (bright) states. On the other hand, plural lines of the lower second electrodes 11-2 are preferably used as signal electrodes that supply the selected picture elements with the voltage for executing a gradational display. The above selectively supplied voltage overlaps with the former initializing voltage and the driving voltage is applied in total between the scanning electrodes and the signal electrodes.

Before describing the first preferred embodiments, the process of fabricating a concrete example of the liquid crystal display panel applied to the present invention will be explained. First, as plural lines of first electrodes 11-1, transparent striped scanning electrodes made of ITO film are formed on an upper transparent substrate 10-1 composed of a glass substrate. Next, the above electrodes are covered with an alignment coating 13-1 made of a polymer having a perpendicular alignment to a liquid crystal. A couple of scanning drivers 20 are connected to the scanning electrodes. Further, as plural lines of second electrodes, transparent striped signal electrodes made of ITO film are formed on a lower transparent substrate 10-2 composed of a glass substrate. Further, the above electrodes are covered with an alignment coating 13-2 made of polymer similar to the former alignment coating 13-1. A couple of data drivers 30 are connected to the signal electrodes. Both substrates 10-1, 10-2 are arranged such that the upper scanning electrodes and the lower signal electrodes are orthogonal to each other in the form of an X-Y matrix construction. Further, the spacer (not illustrated in FIGS. 3A to 3D) is held between the two substrates 10-1, 10-2 to form an enclosed space of about 10 $\mu$m and the above space is sealed entirely, excluding a liquid crystal filling hole.

Thereafter, the following N-C phase transition liquid crystal is filled representative of the liquid crystal 2 from the liquid crystal filling hole into the above space; namely, the liquid crystal that is fabricated by mixing the mixed-type nematic liquid crystal, composed of cyanobiphenyl of 40 wt %, cyanoterphenyl of 10 wt %, cyclohexanbenzoate of 30 wt % and tolane derivative liquid crystal of 10 wt %, with cyclohexanbenzoate of 30 wt %, to which chiral part is added as a cholesteric liquid crystal. If the liquid crystal filling hole is sealed, a liquid crystal display panel 1 is finished.

In the first preferred embodiment, if the desired image is to be formed in the above liquid crystal panel, the driving voltage of about $2V_d$ is preferably applied to the whole area of the liquid crystal display panel 1 in the first stage and the entire liquid crystal is changed into a nematic phase; namely, the homeotropic (H) state as shown in FIG. 3A and "A" of FIGS. 4 and 5, in which the incident light is almost completely transmitted through the liquid crystal. In this case, the parallel molecular axis of a liquid crystal is aligned in the direction of the electric field, since the N-C phase transition type liquid crystal usually has positive dielectric anisotropy. As the driving voltage, the alternating rectangular voltage having periods of about 4 msec is preferably applied, so that the characteristics of a liquid crystal can be prevented from deteriorating due to electric polarization occurring by applying direct voltage for a long time. From now on, the zero-to-peak voltage will be represented as the driving voltage.

In the next stage, when the driving voltage is set at zero once, as shown in "B" of FIGS. 4 and 5, the liquid crystal attains the cholesteric phase as shown in FIG. 3B, in which the molecules have an helical construction macroscopically. To be more specific, a group of molecules are arranged continuously in one domain and the refractive index therein is nearly constant. However, in the neighboring domain, the tilt angle of the corresponding group of molecules are shifted a little discontinuously and the refractive index therein is slightly different from that of the former domain. In such construction, the tilt angle of each domain is shifted gradually, such as spiral steps, and further, the above tilt angle becomes the initial angle again with a fixed helical pitch (for example, 0.8 $\mu$m). This condition of molecules of a liquid crystal is defined as the focal-conic (F) state, i.e., dark state, in which the incident light is scattered sufficiently at the boundary between adjoining domains.

In the first stage, when the driving voltage is set little higher than the sustaining voltage $V_d$ (for example, 12 V) as shown in "C" of FIGS. 4 and 5., each domain is enlarged as shown in FIG. 3C and the helical pitch becomes longer than that of FIG. 3B. Under such conditions, the degree of scattering of molecules of a liquid crystal becomes weaker and therefore the liquid crystal becomes brighter than the dark state in some degrees. In this case, the selected picture elements of a phase transition type liquid crystal display panel 1 have various degrees of brightness, i.e., middle brightness between the bright and dark states in accordance with the level of driving voltage. However, if the voltage for displaying the above middle brightness continues to be applied for a long time, the cumulative response effect occurs under the unstable condition of alignment of the liquid crystal. Therefore, "C" of FIG. 5 shifts gradually to the direction where the driving voltage increases and finally a liquid crystal attains the H (bright) state due to the phase transition. To avoid this phenomenon, the driving voltage corresponding to the desired middle brightness, which is higher than a sustaining voltage $V_d$ and is short of dominance of said phase transition, is applied for such a short time that the cumulative response effect does not occur (for example, 10 msec) as a first step. Thereafter, as a second step, the above voltage is set at the sustaining voltage $V_d$ where a cholesteric phase is sustained stably, as shown in FIG. 3D and "D" of FIGS. 4 and 5. Even though the driving voltage is altered for an instant, the middle brightness can be displayed in accordance with the applied voltage in the first step because of the effect of afterimage and the desired gradational display can be executed. If the gradational display is required to be executed continuously, the above mentioned two steps are preferably repeated with fixed short periods (for example, 20 msec). Even when the above repeated operations are executed for a period of 20 msec, a flicker of the image of the display panel cannot be seen by the naked eye. In this case, if the level of voltage higher than the sustaining voltage $V_d$ and applied for a short time is changed appropriately to control the length of helical pitch of a liquid crystal, the middle brightness can be changed nearly continuously. Heretofore, an example of the gradational display by increasing the brightness in an initial dark state, as shown in "B" of FIG. 5, has been described. On the contrary, it is possible for the gradational display by decreasing the brightness in an initial bright state as shown in "A" of FIG. 5 to be executed.

Figure 8:
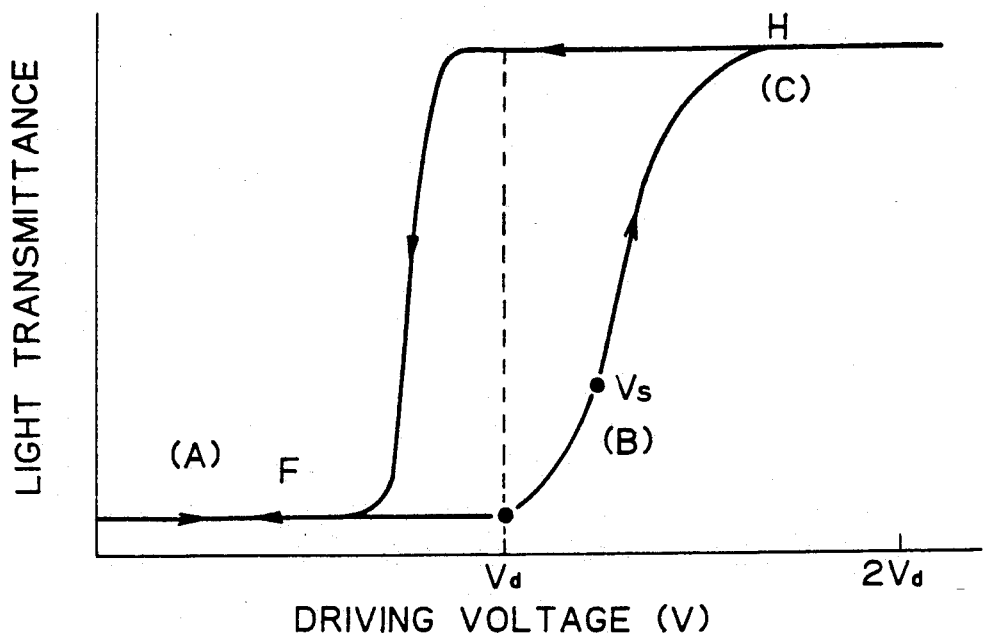
FIG. 8 is a hysteresis curve explaining the operations of FIGS. 6A to 6C.
Figure 9:
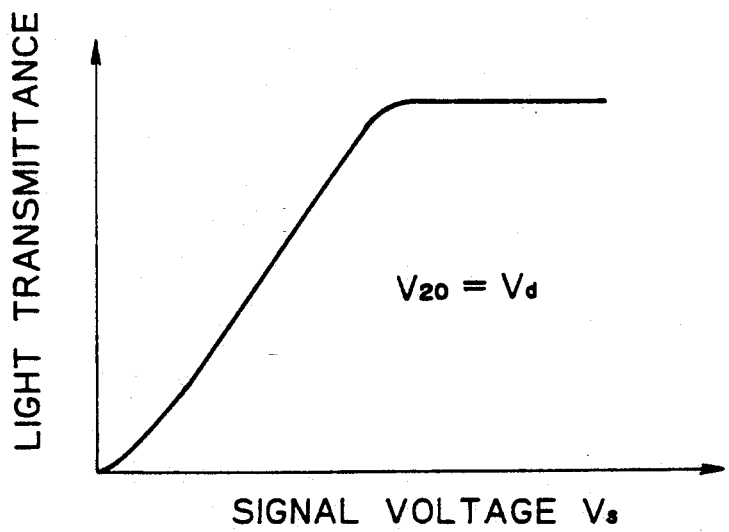
FIG. 9 is a curve showing the light transmittance characteristic in relation to the signal voltage in FIG. 7.

FIGS. 6A, 6B and 6C, FIG. 7, FIG. 8 and FIG. 9 are views explaining the method for driving a phase transition type liquid crystal display device according to a second preferred embodiment. To be more specific, FIG. 6A, 6B and 6C are sectional side views explaining operations of a phase transition type liquid crystal display panel and FIG. 7 is an enlarged cross sectional view showing in detail the conditon of orientation of a phase transition type liquid crystal in FIG. 6B and FIG. 8 is a hysteresis curve for explaining the operations of FIG. 6 and FIG. 9 is a curve showing the light transmittance characteristics in relation to the signal voltage in FIG. 7.

In FIGS. 6A, FIG. 6B and FIG. 6C, liquid crystals 2 are in the F (dark) state, middle state and H (bright) state, respectively. Here, plural lines of first transparent electrodes are formed on the upper first transparent substrate 10-1 as scanning electrodes and plural lines of second electrodes are formed on the lower second transparent substrate 10-2 as signal electrodes, similar to a first preferred embodiment (FIGS. 3A to 3D). In this case, in addition to the above scanning and signal electrodes, plural lines of auxiliary electrodes 13 are arranged between two signal electrodes adjoining each other, respectively. The voltage $V_s$ for executing a gradational display is applied to the above auxiliary electrodes 13. Further, in FIGS. 6A to 6C, two sets of scanning drivers 20 that supply the scanning electrodes with the voltage ($V_{20}$) for initializing all of the picture elements in a liquid crystal display panel 1, are provided for the scanning electrodes. Further, two sets of data drivers 30 that supply the signal electrodes and the auxiliary electrodes 13 selectively with the voltage ($v_S$) for executing a gradational display, are preferably provided in the signal electrodes and auxiliary electrodes 13 respectively. However, in FIGS. 6A to 6C, an example of the electrode configuration in which the signal electrodes are connected to the ground directly, not to the data drivers 30, and only auxiliary electrodes 13 are connected to the above data drivers 30. Further, in this case, only one enlarged picture element in the liquid crystal display panel 1 is illustrated, similar to FIGS. 3A to 3D in a first preferred embodiment. Further, the circuit construction of a phase transition type liquid crystal display device provided with the above auxiliary electrodes will be described later in detail with reference to FIG. 11 and FIG. 12.

In FIG. 6A again, as the voltage $V_{20}$, a sustaining voltage $V_d$ is applied between the scanning electrodes and the signal electrodes by means of scanning drivers 20. Therefore, the liquid crystal 2 is held in the F' (focal-conic) state similar to the F state as shown in FIG. 8. Under such conditions, the incident light is scattered by the molecules of the liquid crystal 2 and the above liquid crystal 2 attains the dark state.

Next, in FIG. 6B, as the voltage $V_d$, the sustaining voltage $V_d$ is applied between the scanning and signal electrodes as mentioned above and simultaneously the signal voltage $V_s$ is applied between the selected signal electrodes and the auxiliary electrodes neighboring the above signal electrodes respectively. In this case, the level of the above signal voltage $V_s$ is predetermined so that the desired brightness can be attained in accordance with the data signal for a gradational display sent from an external circuitry. When the above signal voltage $V_s$ is applied between the selected signal electrodes and the neighboring auxiliary electrodes 13, the corresponding electric field is induced near these two types of electrodes neighboring each other. Consequently, the electric field is applied for the molecules of the liquid crystal in the given portion of each selected picture and the molecules are aligned in the direction of electric filed. Consequently, the length of helical pitch is partially altered. In other words, the additional voltage that is higher than the sustaining voltage and is short of dominance of phase transition, is applied equivalently between the upper scanning electrodes and the lower auxiliary electrodes 13. The above additional voltage is given by overlapping the sustaining voltage supplied by the scanning driver 20 with the signal voltage supplied by the data driver 30. In this case, the degree of alteration of the length of the helical pitch does not need to be controlled accurately and only the change in the depth of the given portion liquid crystal layer, in which helical pitch is elongated, has to be controlled. Here, even though the signal voltage is applied continuously between the selected signal electrodes and the neighboring auxiliary electrodes 13, the major part of one picture element is stable in the F (F') state. Therefore, the middle brightness in the picture element does not change because of the cumulative response effect and the phase does not transfer to the H (H') state, different from a first preferred embodiment. After all, in a second preferred embodiment, the gradational display can be executed by changing the average length for the whole area in one picture element with the positional control of length of a helical pitch, instead of the control thereof by the time as described in a first preferred embodiment.

In FIG. 7, the condition of the liquid crystal alignment in FIG. 6B is illustrated and enlarged. When the signal voltage $V_s$ is applied between the selected electrodes and the neighboring auxiliary electrodes 13, the corresponding electric potential difference has occurred and the parallel axis of the molecules of the liquid crystal 2 is aligned in the direction of the electric field induced by the above potential difference. In the portion that the electric field is induced, the molecules of the liquid crystal are arranged nearly continuously and the light is not strongly scattered, different from the other portion of the liquid crystal. Consequently, the light transmittance of the portion in which the electric field is induced becomes higher than the other portion and the display of the middle brightness can been realized.

Further, in FIG. 6C, the sustaining voltage $V_d$ where the H (H') state can be sustained is applied between the scanning electrodes and the signal electrodes by means of the scanning drivers 20. In this case, the incident light is transmitted through a liquid crystal 1 completely by scattering, and therefore the liquid crystal 1 attains the bright state.

As shown in FIG. 9, when the signal voltage $V_s$ is changed, the light transmittance of a liquid display panel 2 (for example, FIG. 7) can be changed nearly linearly and reproducibly. By virtue of the characteristics, the gradational display can be displayed stably and can be applied to a projection type display. Heretofore, an example of the gradational display by increasing the brightness in an initial dark state, as shown in "B" of FIG. 8, has been described. On the contrary, it is possible for the gradational display to be executed by decreasing the brightness in an initial bright state as shown in "A" of FIG. 9. In this case, immediately after initializing all of the picture elements into a bright state with the voltage $2V_d$, the driving voltage must be set at the voltage for executing the gradational display, without changing the polarity of the alternating voltage.

FIGS. 10A, 10B, 10C, 10D and 10E are time charts showing the waveforms of a driving voltage for executing a gradational display according to a second preferred embodiment.

First, in FIG. 10A, the driving voltage of about $2V_d$ between the scanning electrodes and the signal electrodes is applied between the scanning electrodes and the signal electrodes by means of scanning drivers and all the picture elements in a liquid crystal display panel to allow a write operation.

Next, when the write operation of the dark state is required to be executed, the sustaining voltage $V_d$ is applied between the above two types of electrodes with the timing shown in FIG. 10B in which the voltage passes through zero and changes in its polarity immediately after initializing. On the other hand, when a write operation of the bright state is required to be executed, the sustaining voltage $V_d$ is applied between the above two kinds of electrodes with the timing shown in FIG. 10C, in which the voltage is changed from $2V_d$ to $V_d$ immediately after initializing without passing through zero.

Further, when each of the states obtained by the above write operations is required to be stored, the driving voltage is held at the sustaining voltage $V_d$ for the required time, as shown in FIG. 10D.

In the meantime, when a write operation of a gradational display with a middle brightness is required to be executed, the signal voltage $V_s$ for attaining the desired middle brightness is applied between the scanning electrode and the neighboring auxiliary electrode corresponding to each of the selected picture elements for the required time, by means of data drivers. In this case, the condition of a liquid crystal in each picture element is controlled mainly by the signal electrode and therefore the phase transition of a liquid crystal does not occur because of the cumulative response effect, even though the signal voltage $V_s$ continues to be applied for a relatively long time, different from a first preferred embodiment. However, in a second preferred embodiment, the excessive electrodes, such as auxiliary electrodes, need to be arranged to apply the signal voltage for a gradational display. A sequence of operations as above mentioned for driving a phase transition type liquid crystal display device are preferably executed under the control of external signals. Consequently, the gradational display can be attained for various kinds of characters, graphics and images.

Further, in both the first and second electrodes, a method of a gradational display by area has been illustrated in which the gradational display can be executed for only one direction of two orthogonal directions of the X-axis and Y-axis, e.g., the direction of Y-axis. However, if the scanning electrodes arranged along the X-axis are utilized as the signal electrodes after initializing all the picture elements, a dot gradational display by the picture element can be realized.

Figure 12:
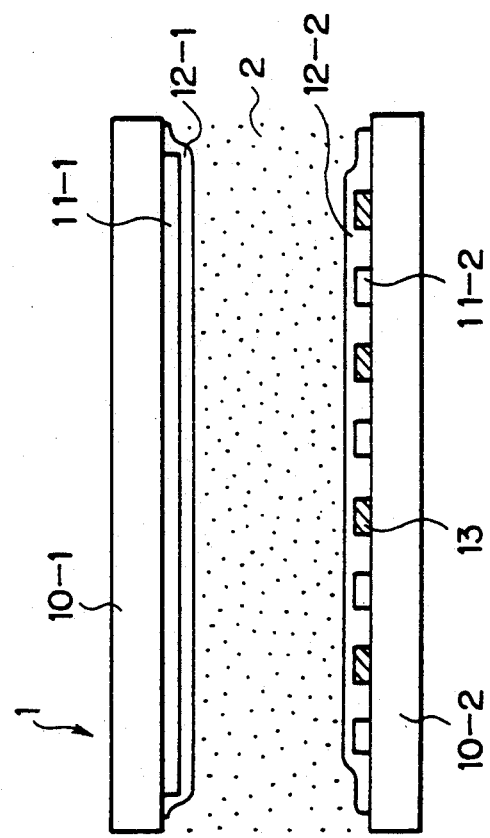
FIG. 12 is a cross sectional view taken along the lines A—A of FIG. 12.

FIG. 11 and FIG. 12 are views showing a concrete example of a liquid crystal display device for executing the helical pitch control according to a second preferred embodiment. To be more specific, FIG. 12 is an example of an electrode configuration for executing a gradational display and FIG. 13 is a cross sectional view taken along the lines A—A of FIG. 12.

In FIG. 12, a phase transition type liquid crystal display panel 1 is fabricated by the same processes as described in FIGS. 3A to 3D, except that the process of forming auxiliary electrodes 13 on the lower second transparent substrate 11-2 is added. To be more specific, the signal electrodes and the auxiliary electrodes 13 are composed of two kinds of comb-type electrodes respectively, in which finger portions extending from opposite sides are arranged alternately. Two sets of scanning drivers 20 are connected to the scanning electrodes corresponding to plural lines of first electrodes 11-1, one of two sets of data drivers 30 are connected to the signal electrodes corresponding to plural lines of second electrodes 11-2. Another set of data drivers 30 are connected to auxiliary electrodes 13. Further, both substrates 10-1, 10-2 in a liquid crystal display panel 1 are arranged such that the upper scanning electrodes and the lower signal and auxiliary electrodes are orthogonal to each other in the form of an X-Y matrix construction. The space between the upper and the lower electrodes are determined by the spacer of about 10 μm.

The signal electrodes are generally arranged with eleven lines per one millimeters (11 lines/mm) i.e., with the space between adjoining lines of about 10 μm. Accordingly, it is not so difficult technically for the auxiliary electrodes 13 to be inserted between adjoining signal electrodes respectively so that the above two kinds of electrodes are arranged alternatively. Recently, the density of picture elements in a phase transition type liquid crystal panel 1 is likely to be significantly high (for example, about nine million elements per one panel). Therefore, the space between the upper electrodes and the lower electrodes i.e., the thickness of the liquid crystal layer has the same order as the space between adjoining electrodes; i.e., the gap between two electrodes on the same substrates, as already described. Utilizing the above relation, and the electric field between the adjoining electrodes can be easily controlled. Consequently, the scattering of the incident light in a liquid crystal can change slightly and the gradational display can be executed with high resolution.

Figure 13:
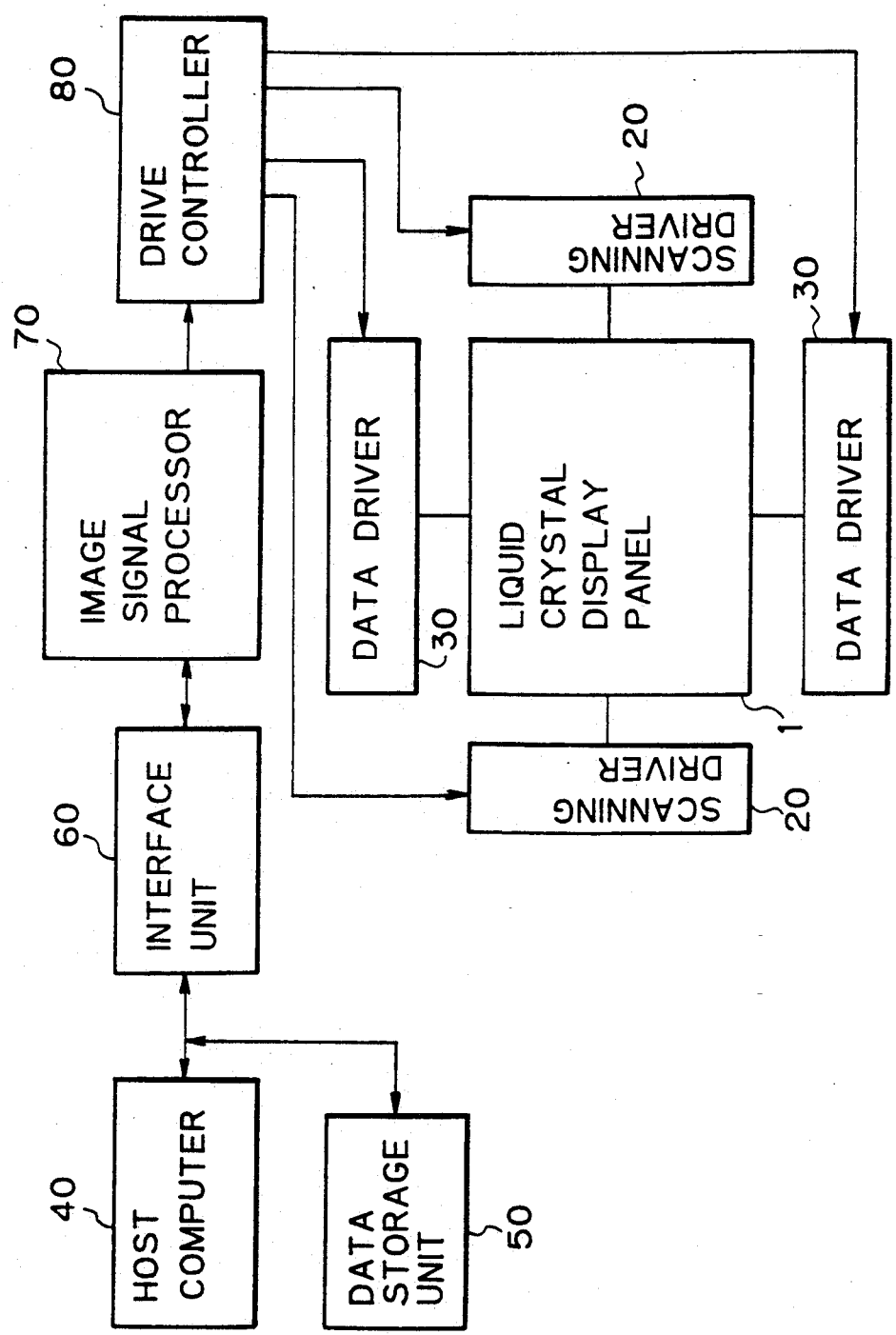
FIG. 13 is a block circuit diagram for executing a gradational display according to a second preferred embodiment.

FIG. 13 is a block circuit diagram for executing a gradational display according to a second preferred embodiment.

Figure 14:
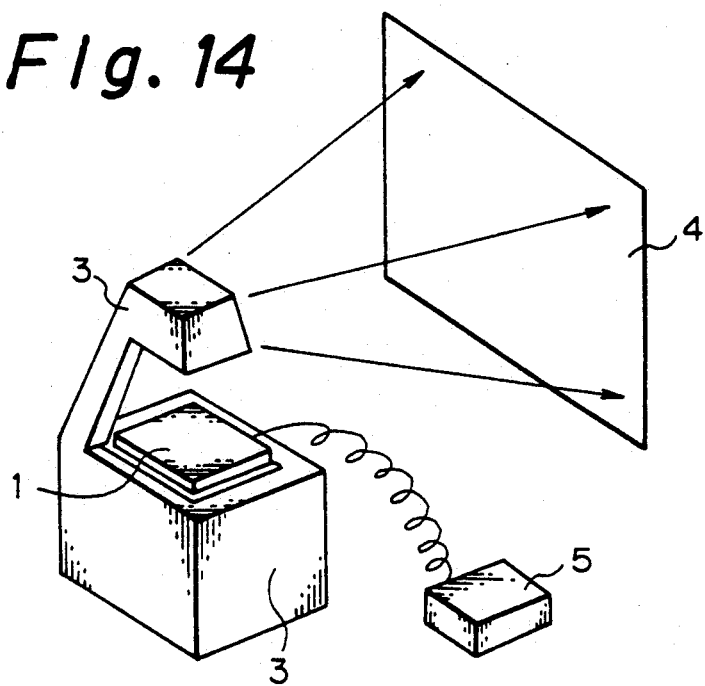
FIG. 14 is a perspective view showing an example in which the present invention is applied to the projection type liquid crystal display device.

In FIG. 14, 40 denotes a host computer, which controls a sequence of operations for executing the gradational display on the selected picture elements in a phase transition type liquid crystal panel 1. 50 denotes a data storage unit, such as a compact disk (CD) and optical disk, which stores the required image data. 60 denotes an interface unit, such as RS232C interface, which transfers the stored image data with high speed. 70 denotes an image signal processor, which is composed of microprocessor unit (MPU), read only memory (ROM), random access memory (RAM) and the like and which transforms the image data into the image signals with high speed. 80 denotes a drive controller, which sends the image signals output from the image signal processor 70 to two sets of scanning drivers 20 and signal drivers 30.

Further, the sequence for displaying the desired image with the middle brightness on the picture elements by processing the image data for a gradational display will be explained.

First, the image data stored in a data storage unit 50 are sent to an image signal processor 70, via an interface unit 60, under the control of a host computer 40. Next, the image data is transformed into the image signals and they are allocated to the scanning electrodes, the signal electrodes and the auxiliary electrodes by time division. Further, the signals required for driving a liquid crystal are output from the scanning and signal drivers 20, 30 by virtue of drive control signals by time division and then the picture elements in a phase transition type liquid crystal panel 1 are scanned by means of line-at-a-time scanning. When the picture elements in which the line-at-a-time scanning has been executed once, these elements are held in the current state (bright state, middle state and dark state) because of the memory effect of the liquid crystal itself. In this case, the image data can be changed easily under the control of the host computer 40 and therefore the gradational display with the middle brightness can be executed swiftly for the image on the liquid crystal display panel 1.

FIG. 14 is a perspective view showing an example in which the present invention is applied to the projection type liquid crystal display device. In this case, the OHP type display device is illustrated as the representative of a projection type liquid crystal display device.

In FIG. 14, 3 denotes an optical system, which allows the image formed on a phase transition type liquid crystal display panel 1 to be enlarged and to be projected, such as an OHP. 4 denotes a screen, on which the enlarged image is projected. 5 denotes a drive control system, which includes scanning drivers 20 and signal drivers 30, etc. and processes various signals issued from a personal computer, a television or the like.

In such construction, the light, which does not enter the condensing lens of an optical system 3 because of the scattering, cannot reach the screen 4. Therefore, even when the light is slightly scattered to the surroundings, the above scattered light is not projected on the screen any more. Consequently, the image contrast on the screen can be much better than that of other display devices. Thus, it is preferable that a phase transition type liquid crystal display device utilizing the change of light scattering by control of the helical pitch of the liquid crystal should be used as a projection type display device.

Figure 15:
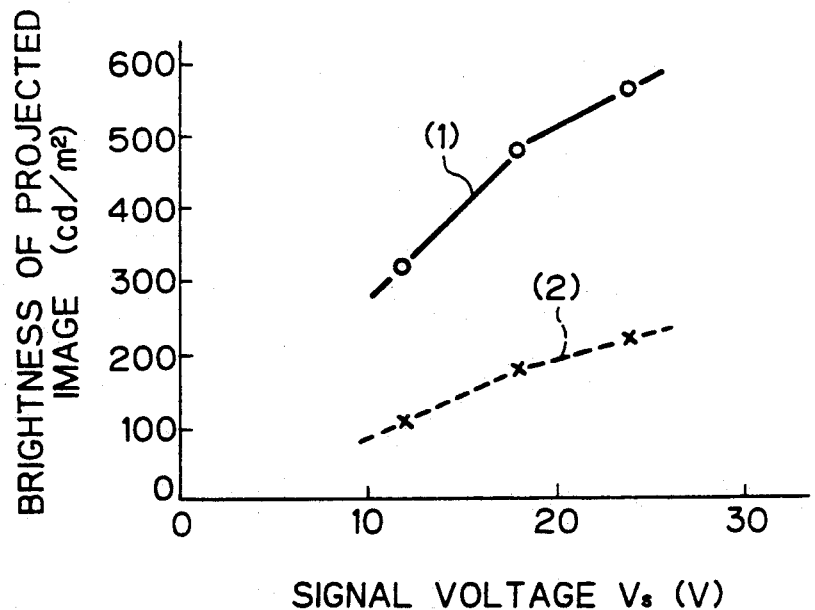
FIG. 15 is a curve showing the brightness of an image on a screen in relation to the signal voltage in an example of FIG. 14.

FIG. 15 is a curve showing the brightness of the image on a screen in relation to the signal voltage in an example of FIG. 15.

In FIG. 15, the actual data of the brightness characteristic of a projected image, particularly, according to a second preferred embodiment are illustrated as a graph. In this graph, the brightness of the projected image is taken on the ordinate axis (Y-axis), while the signal voltage between the signal electrodes and the adjoining electrodes is taken on the quadrature axis (X-axis). Further, in this figure, the data of (1) denotes the brightness change in H (bright) state, while the data of (2) denotes the brightness change in the F (dark) state. To be more specific, in the former case (1), when the liquid crystal is in the H state, i.e., nearly transparent state in which a sufficiently high voltage is applied between the scanning electrodes and the signal electrodes, the signal voltage is applied between the selected signal electrodes and the adjoining auxiliary electrodes. Under such conditions, the bright gradational display, in which the liquid crystal has a higher light transmittance in total and the background of the projected image is relatively bright, can be executed. On the other hand, in the latter case (2), when the liquid crystal is in the F state, i.e. scattering state in which the low voltage of scattering mode is applied between the scanning electrodes and the signal electrodes, the signal voltage is applied between the selected signal electrodes and the adjoining auxiliary electrodes. Under such conditions, the dark gradational display, in which the liquid crystal has a lower light transmittance in total and the background of the projected image is relatively dark, can be executed. In summary, a projection type gradational display device, which is bright and has excellent contrast and which enables the brightness of a projected image to be changed stably and continuously over a wide range, can be realized, by controlling the signal voltage $V_s$ appropriately.

Although the present invention has been described in its preferred embodiments, it is understood that the material for fabrication, such as a liquid crystal, and the electrode configuration, etc., which has been used in the preferred embodiments, may be replaced optionally with the other components and may be changed in combination thereof, without departing from the spirit and the scope of the invention as claimed.

As explained above, according to a first and second preferred embodiment, the length of a helical pitch can be changed continuously by controlling the level of the driving voltage by a time and in the given portion of each selected picture element. Therefore, the transmittance of light that is transmitted through a liquid crystal can be changed nearly linearly and stably.

I claim:

1. A method for driving a phase transition type liquid crystal device having:
   a phase transition type liquid crystal display panel that is fabricated by filling and sealing the liquid crystal that is capable of phase transition between the nematic phase having an infinite length of helical pitch and the cholesteric phase having a fixed length thereof, in an enclosed space formed by confronting a first transparent substrate and a second transparent substrate with each other, said first substrate including plural lines of first electrodes and an alignment coating formed thereon and said second substrate including plural lines of second electrodes orthogonal to said first electrodes and an alignment coating formed thereon; and a driver applying an appropriate voltage between said first electrodes and second electrodes selectively, forcing given portion of said liquid crystal to be in a nematic phase or cholesteric phase and enabling a respective corresponding bright condition or dark condition to be displayed on said phase transition type liquid crystal display panel, said method comprising the step of:

controlling the length of said helical pitch appropriately by altering said applied voltage, so that the brightness corresponding to a middle condition between said bright condition and said dark condition can be displayed and a gradational display can be attained, said step of controlling including the substep of applying the voltage that is below a sustaining voltage where said nematic phase is sustained stably and is short of dominance of said phase transition, for a given time to picture elements in said phase transition type liquid crystal panel selectively formed corresponding to all the intersections between said first and second electrodes, and thereafter the substep of setting said applied voltage at said sustaining voltage so that the gradational display can be executed by altering the length of said helical pitch in each of said selected picture element by the given time, said two substeps being repeated a plurality of times.

2. A method for driving a phase transition type liquid crystal device having:

a phase transition type liquid crystal display panel that is fabricated by filling and sealing the liquid crystal that is capable of phase transition between the nematic phase having an infinite length of helical pitch and the cholesteric phase having a fixed length thereof, in an enclosed space formed by confronting a first transparent substrate and a second transparent substrate with each other, said first substrate including plural lines of first electrodes and an alignment coating formed thereon and said second substrate including plural lines of second electrodes orthogonal to said first electrodes and an alignment coating formed thereon; and a driver applying an appropriate voltage between said first electrodes and second electrodes selectively, forcing given portion of said liquid crystal to be in a nematic phase or cholesteric phase and enabling a respective corresponding bright condition or dark condition to be displayed on said phase transition type liquid crystal display panel, said method comprising the step of:

controlling the length of said helical pitch appropriately by altering said applied voltage, so that the brightness corresponding to a middle condition between said bright condition and said dark condition can be displayed and a gradational display can be attained, said step of controlling including the substep of applying the voltage that is above a sustaining voltage, where said cholesteric phase is sustained stably and is short of dominance of said phase transition, for a given time to picture elements in said phase transition type liquid crystal panel selectively formed corresponding to all the intersections between said first and second electrodes, and thereafter the substep of setting said applied voltage at said sustaining voltage so that the gradational display can be executed by altering the length of said helical pitch in each of said selected picture element by the given time.

3. A method as set forth in claim 1, wherein either of said first and second electrodes are scanning electrodes that supply said phase transition type liquid crystal display panel with the voltage for initializing all of said picture elements, and wherein at least one of said first and second electrodes are signal electrodes that supply the selected picture elements of said phase transition type liquid crystal panel with the voltage for executing a gradational display.

4. A method for driving a phase transition type liquid crystal device having:

a phase transition type liquid crystal display panel that is fabricated by filling and sealing the liquid crystal that is capable of phase transition between the nematic phase having an infinite length of helical pitch and the cholesteric phase having a fixed length thereof, in an enclosed space formed by confronting a first transparent substrate and a second transparent substrate with each other, said first substrate including plural lines of first electrodes and an alignment coating formed thereon and said second substrate including plural lines of second electrodes orthogonal to said first electrodes and an alignment coating formed thereon; and, a driver applying an appropriate voltage between said first electrodes and second electrodes selectively, forcing given portion of said liquid crystal to be in a nematic phase or cholesteric phase and enabling a respective corresponding bright condition or dark condition to be displayed on said phase transition type liquid crystal display panel, said method comprising the step of:

controlling the length of said helical pitch appropriately by altering said applied voltage, so that the brightness corresponding to a middle condition between said bright condition and said dark condition can be displayed and a gradational display can be attained, said step of controlling including the substep of applying a sustaining voltage where said nematic phase is sustained stably to all of the picture elements in said phase transition type liquid crystal display panel, which are formed corresponding to all the intersections between said first and second electrodes, and simultaneously the substep of applying the voltage that is below said sustaining voltage and is short of dominance of said phase transition to the given portions of the selected picture elements so that the gradational display can be executed by altering the average length of said helical pitch in each of said selected picture elements, either of said first and second electrodes being scanning electrodes that supply said phase transition type liquid crystal display panel with a voltage for initializing all of said picture elements, and at least one of said first and second electrodes being signal electrodes that supply the given portions of said selected picture elements of said phase transition type liquid crystal panel with the voltage for executing a gradational display, and plural lines of auxiliary electrodes being arranged between the adjoining signal electrodes respectively, and the voltage for executing a gradational display being selectively applied to said auxiliary electrodes.

5. A method for driving a phase transition type liquid crystal device having:

a phase transition type liquid crystal display panel that is fabricated by filling and sealing the liquid crystal that is capable of phase transition between the nematic phase having an infinite length of helical pitch and the cholesteric phase having a fixed length thereof, in an enclosed space formed by confronting a first transparent substrate and a second transparent substrate with each other, said first substrate including plural lines of first electrodes and an alignment coating formed thereon and said second substrate including plural lines of second electrodes orthogonal to said first electrodes and an alignment coating formed thereon; and, a driver applying an appropriate voltage between said first electrodes and second electrodes selectively, forcing given portion of said liquid crystal to be in a nematic phase or cholesteric phase and enabling a respective corresponding bright condition or dark condition to be displayed on said phase transition type liquid crystal display panel, said method comprising the step of:

controlling the length of said helical pitch appropriately by altering said applied voltage, so that the brightness corresponding to a middle condition between said bright condition and said dark condition can be displayed and a gradational display can be attained, said step of controlling including the substep of applying a sustaining voltage where said cholesteric phase is sustained stably to all of the picture elements in said phase transition type liquid crystal display panel, which are formed corresponding to all the intersections between said first and second electrodes, and simultaneously the substep of applying the voltage that is above said sustaining voltage and is short of dominance of said phase transition to the given portions of the selected picture elements so that the gradational display can be executed by altering the average length of said helical pitch in each of said selected picture elements, either of said first and second electrodes being scanning electrodes that supply said phase transition type liquid crystal display panel with a voltage for initializing all of said picture elements, and at least one of said first and second electrodes being signal electrodes that supply the given portions of said selected picture elements of said phase transition type liquid crystal panel with the voltage for executing a gradational display, and plural lines of auxiliary electrodes being arranged between the adjoining signal electrodes respectively, and the voltage for executing a gradational display being selectively applied to said auxiliary electrodes.

6. A method as set forth in claim 4, wherein said signal electrodes and said auxiliary electrodes are composed of two kinds of comb-type electrodes respectively in which finger portions extending from opposite side are alternately arranged.

7. A method as set forth in claim 4, for driving said phase transition type liquid crystal device further comprising an optical system that allows the image formed on said phase transition type liquid crystal display panel to be enlarged and projected on a screen, wherein said method includes the substep of altering the transmittance of light that is transmitted through said phase transition type liquid crystal display panel by controlling the length of said helical pitch, and further comprising the step of adjusting the amount of light that reaches said optical system so that the brightness corresponding to said middle condition can be displayed on said screen.

8. A method as set forth in claim 2, wherein either of said first and second electrodes are scanning electrodes that supply said phase transition type liquid crystal display panel with the voltage for initializing all of said picture elements, and wherein at least one of said first and second electrodes are signal electrodes that supply the selected picture elements of said phase transition type liquid crystal panel with the voltage for executing a gradational display.

9. A method as set forth in claim 5, wherein said signal electrodes and said auxiliary electrodes are composed of two kinds of comb-type electrodes respectively in which finger portions extending from opposite side are alternatively arranged.

10. A method as set forth in claim 5, for driving said phase transition type liquid crystal device further comprising an optical system that allows the image formed on said phase transition type liquid crystal display panel to be enlarged and projected on a screen, wherein said method includes the substep of altering the transmittance of light that is transmitted through said phase transition type liquid crystal display panel controlling the length of said helical pitch, and further comprising the step of adjusting the amount of light that reaches said optical system so that the brightness corresponding to said middle condition can be displayed on said screen.

11. A method for generating an intermediate state of transmissivity to incident light in a liquid crystal medium having a nematic phase in which the liquid crystal medium has a high transmissivity to the incident light, and having a cholesteric phase in which the liquid crystal medium has a low transmissivity to the incident light, comprising the steps of:

a) applying a first alternating voltage to the liquid crystal medium, having a peak amplitude which is sufficient to drive the liquid crystal medium into a transition phase between the nematic and cholesteric phases, to generate the intermediate state; and b) applying a second alternating voltage to the liquid crystal medium, having a peak amplitude which is short of the voltage which drives the liquid crystal medium into the nematic phase, to hold the intermediate state generated by the first alternating voltage.

12. A method as claimed in claim 11, wherein the steps (a) and (b) are sequentially repeated.

13. A method as claimed in claim 12, wherein the first alternating voltage has a period of about four milliseconds and the second alternating voltage has a period of about four milliseconds, and wherein said step (a) is performed for about ten milliseconds and said step (b) is performed for about ten milliseconds.

14. A method for generating an intermediate state of transmissivity to incident light in a liquid crystal medium having a nematic phase in which the liquid crystal medium has a high transmissivity to the incident light, and having a cholesteric phase in which the liquid crystal medium has a low transmissivity to the incident light, comprising the steps of:

a) applying a first alternating voltage to the liquid crystal medium, having a peak amplitude which is sufficient to drive the liquid crystal medium into a transition phase between the nematic and cholesteric phases, to generate the intermediate state; and b) applying a second alternating voltage to the liquid crystal medium, having a peak amplitude which is more than the voltage which drives the liquid crystal medium into the cholesteric phase so that the liquid crystal medium is not driven into the cholesteric phase, to hold the intermediate state generated by the first alternating voltage.

15. A method as claimed in claim 14, wherein said steps (a) and (b) are sequentially repeated.

16. A method as claimed in claim 15, wherein the first alternating voltage has a period of about four milliseconds, and the second alternating voltage has a period of about four milliseconds, and wherein said step (a) is performed for about ten milliseconds and said step (b) is performed for about ten milliseconds.

* * * * *

UNITED STATES PATENT AND TRADEMARK OFFICE
CERTIFICATE OF CORRECTION

PATENT NO. : 5,274,484

DATED : December 28, 1993

INVENTOR(S) : Akihiro MOCHIZUKI et al.

It is certified that error appears in the above-indentified patent and that said Letters Patent is hereby corrected as shown below:

Column 3, line 17, change "log" to --lag--.

Column 4, line 41, delete "a";

line 54, after "58-5791" insert --)--.

Column 5, line 1, change "FIG." to --FIGS.--.

Column 6, line 6, delete "a";

line 33, change "FIG." to --FIGS.--, and after "2" insert --A and B--.

Column 7, line 17, after "2" insert --A and 2B--.

UNITED STATES PATENT AND TRADEMARK OFFICE
CERTIFICATE OF CORRECTION

PATENT NO. : 5,274,484
DATED : December 28, 1993
INVENTOR(S) : Akihiro MOCHIZUKI et al.

It is certified that error appears in the above-indentified patent and that said Letters Patent is hereby corrected as shown below:

Column 8, line 59, change "5." to --5--.

Column 9, line 42, change "FIG." to --FIGS.--;

line 48, change "FIG." to --FIGS.--, and after "6" insert --A, 6B, 6C--;

line 51, change "FIGS." to --FIG.--.

Column 10, line 42, change "filed" to --field--.

Column 18, line 31, change "side" to --sides--.

Signed and Sealed this

Ninth Day of August, 1994

Attest:

BRUCE LEHMAN

Attesting Officer

Commissioner of Patents and Trademarks